United States Patent Office 3,606,093
Patented Sept. 20, 1971

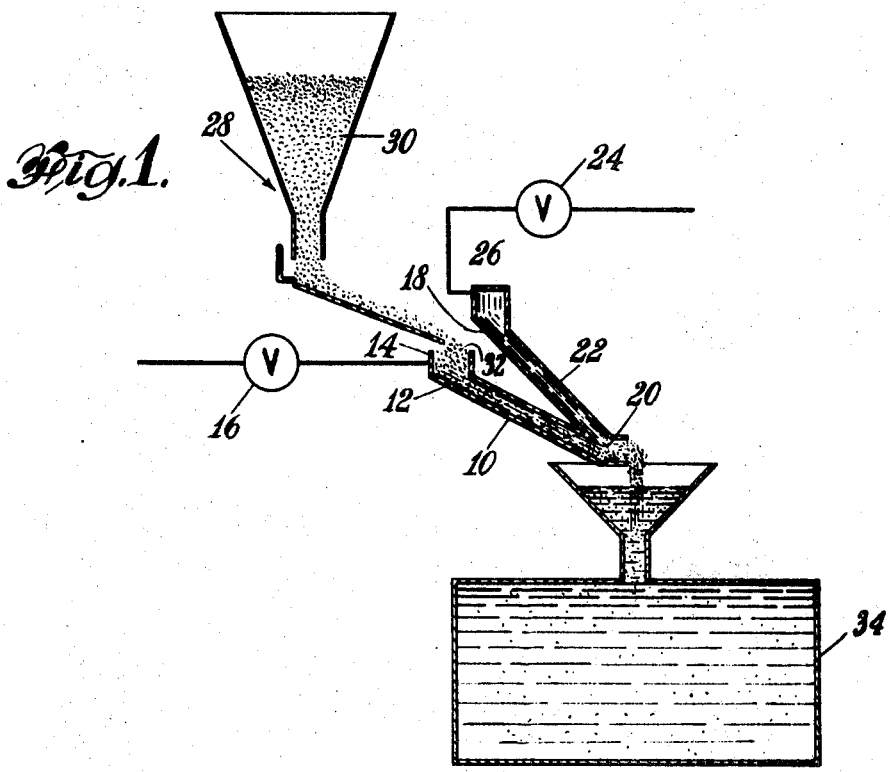
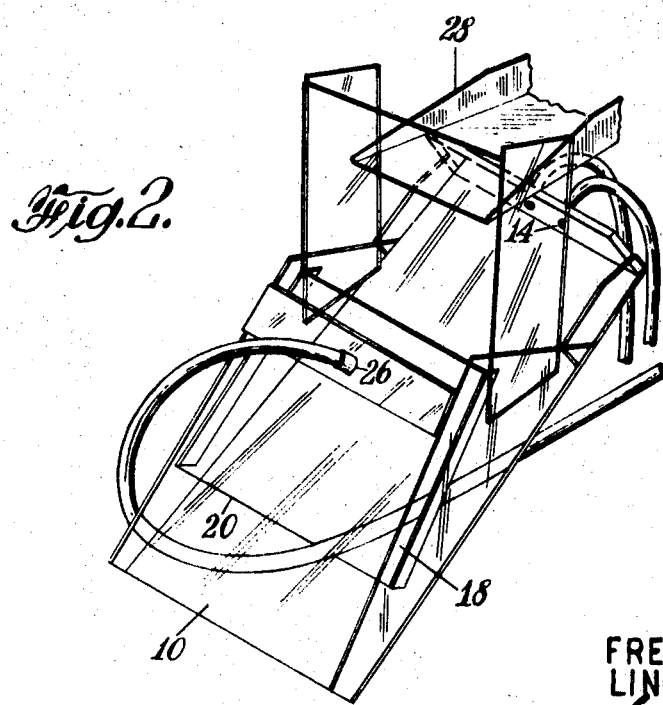
INVENTORS
FREDERICK J. MORSE
LINCOLN A. CARTER
ATTORNEY

3,606,093
DISPERSING DEVICE AND PROCESS FOR USE
Frederick J. Morse, Monroe, N.Y., and Lincoln A. Carter, Ringwood, N.J., assignors to Union Carbide Corporation, New York, N.Y.
Filed Dec. 9, 1968, Ser. No. 782,126
Int. Cl. B67d 5/60
U.S. Cl. 222—145                            2 Claims

ABSTRACT OF THE DISCLOSURE

A dispersing device which is useful in the preparation, under the non-shearing conditions, of solutions of materials which ordinarily are difficult to dissolve, is comprised of at least one surface over which passes a thin film of liquid, a dispenser for dispensing a narrow sheet of finely divided material onto the film and at least one mechanism for controlling the liquid flow and dispensing rates so as to provide a predetermined concentration of material in the solution.

---

This invention relates to a dispersing device and to a process for its use. In one aspect, this invention relates to a dispersing device which is useful in the preparation, under non-shearing conditions, of solutions of materials which ordinarily are difficult to dissolve. In a further aspect, this invention is directed to concentrated aqueous solutions of certain organic polymeric materials which can be conveniently prepared without molecular weight degradation.

Although a wide variety of synthetic polymers, as well as the natural gums and resins, are employed extensively in industry, many are difficult to dissolve or disperse in liquids. In many instances this feature either limits their use or renders them undesirable for specific applications. For instance, it is usually difficult or impossible to prepare solutions or dispersions of certain synthetic polymers having a solids content of over about 10 weight percent due to their tendency to form stiff gels. Moreover, the rate of solution oftentimes is slowed by the tendency of the polymer particles to adhere to one another upon wetting. This occasionally results in the formation of gel lumps which dissolve at a much slower rate than the individual particles. While it is possible to minimize the formation of gel lumps through the careful regulation of the rate of addition of material to liquid, or by the use of high-speed agitation, such practice is often undesirable. If agitation is effected under high shear conditions, the mechanical shearing forces may cause molecular weight degradation. The effect of the molecular weight degradation is more prevalent in polymers having the higher molecular weights. Moreover, equipment limitations often make it impossible to agitate the liquid sufficiently to prevent formation of gel lumps, even with careful addition of polymer. This undoubtedly results in a delay of several hours while the dissolving operation is completed.

For example, a recent, outstanding development in the chemical art has been the expansion and growth in the use of water-soluble polymers. The water-soluble feature provides a convenient and inexpensive means for handling the polymers and also provides a variety of unique applications not heretofore possible. For example, water-soluble polymers have been employed as binders, thickeners, water-soluble films, and the like. More recently, water-soluble resins prepared by the polymerization of lower alkylene oxides, such as ethylene oxide, to polymeric compounds having molecular weights in the range of from about one hundred thousand to about ten million, and higher, are showing remarkable promise in this area. Their water-solubility renders them suitable for numerous uses, such as textile warp sizing, coagulation of various slurries, adhesives, and the like. However, notwithstanding the numerous, distinctive properties which characterize the olefin oxide polymers they are particularly difficult to disperse in an aqueous medium and hence for many applications other polymers or resins may be preferred.

Accordingly, one or more of the following objects will be achieved by the practice of the instant invention. It is an object of the present invention to provide a novel dispensing device which is useful in the preparation of solutions of materials which ordinarily are difficult to dissolve in a liquid medium. Another object is to provide a process for preparing solutions of polymers of relatively high concentrations. A further object of this invention is to provide a process for dissolving natural resins and polymers in an aqueous medium under non-shearing conditions. A still further object is to provide a process for readily dispersing and dissolving olefin oxide polymers comprised of at least 50 weight percent of ethylene oxide in copolymerized form with up to 50 weight percent of lower olefin oxides, such as propylene oxide, butylene oxide, and the like. Another object of this invention is to provide a process for dispersing and dissolving natural gums and resins. A further object of this invention is to provide a process for dispersing and dissolving poly(ethylene oxide). A still further object is to provide aqueous solutions of poly(ethylene oxide) in concentrations which were previously impossible to prepare without shear degradation. These and other objects will readily become apparent to those skilled in the art in the light of the teachings herein set forth.

In its broad aspect, the present invention is directed to a novel dispersing device. The invention also encompasses a process for its use as well as certain concentrated solutions prepared therefrom. The dispersing device of this invention is comprised of, in combination, at least one surface over which passes a thin film of liquid, a dispenser for dispensing a thin sheet of finely divided material on to the film and at least one mechanism for controlling the liquid flow and dispensing rates so as to provide a predetermined concentration of material in solution. In one preferred aspect the dispersing device is comprised of a first inclined surface over which passes a thin first layer of liquid, a second inclined surface positioned over and above the first surface, the lowest edge of which terminates at a point above the first surface so as to pass a second thin layer of liquid which merges with the first layer, and an apparatus for dispensing a narrow sheet of the material in finely divided form onto the first layer at a point before the merger of the first and second layers.

The objects of the invention and the preferred embodiments thereof will best be understood by reference to the accompanying drawings, wherein FIG. 1 is a side view of the dispersing device and FIG. 2 a perspective view of the inclined surfaces over which the solvent layers flow.

With reference to the drawings the dispensing device of this invention, as shown in FIGS. 1 and 2, is comprised of a first inclined surface 10 over which passes a first thin layer of solvent 12. The solvent is introduced at the higher end of surface 10 at point 14 by one or more entrance means and its flow rate regulated by valve means 16. A second inclined surface 18 is positioned above and over surface 10, the lowest edge of which 20 terminates at a point above surface 10 so that a second thin layer of solvent 22 passing over surface 18 merges with the first layer. Valve means 24 controls the flow rate of the second layer which is introduced at the higher end of surface 18 at point 26. Apparatus 28 containing the material 30 in finely divided form, dispenses it onto the first solvent layer at point 32. The two solvent layers merge at point 20 and are collected and mixed under low shear conditions in container 34.

In accordance with the present invention, it has been found that the preparation of solution of materials such as many natural resins and polymers can be considerably enhanced by employing the novel dispersing device as hereinafter described. Although the device and process of this invention can be employed to disperse most any material in a liquid, it is particularly applicable for use in the preparation of solutions of resin or polymer granules which tend to stick together after a partial wetting resulting in undesirable gel lumps. Although not wishing to be bound by any theory regarding the mechanism by which the present invention operates, it is believed that the device herein described sufficiently wets the entire outer surface of the granules or particles while they are dispersed so that even if they contact each other during mixing, they are sufficiently wet to avoid sticking or undesirable lump or gel formation. The material is thereby more uniformly dispersed in the solvent and can thereafter dissolve at an even rate.

As hereinbefore indicated, the dispersing device of this invention is useful in the preparation of solution of most any material which is ordinarily difficult to dissolve due to, for example, lumping or gel formation. Illustrative materials for which the dispersing device of this invention is ideally suited include, among others, olefin polymers, e.g., ethylene oxide homopolymers, ethylene oxide copolymers comprised of at least 50 weight percent ethylene oxide in copolymerized form with up to 50 weight percent of at least one other olefin oxide, and the like; methyl cellulose, carboxymethyl cellulose, sodium carboxymethylcellulose, hydroxyethyl cellulose, and the like; polyvinyl alcohol, polyacrylic acid, polystyrene, polyethylene, polypropylene, polyacrylamide, polyvinylpyrrolidone, and the like; the natural starches, the natural and synthetic resins, e.g., gum arabic, gum tragacanth, gum Karaya, gum khatti, gum guar, agar, and the like; the various crude, refined, and distilled grades of wood rosin, wood rosin residue products, alkali soaps of wood rosin residue products, ester gums of wood rosin, i.e. the reaction product of wood rosin and polyhydric compounds, ester gums of wood rosin residue products, polymerized wood rosin, esters of polymerized wood rosin, hydrogenated wood rosin, esters of hydrogenated wood rosins, dehydrogenated rosin, the resinous terpene mono- and polybasic acids, such as abietic acid, and the like. Various grades of wood rosin including such grades as K through WW can be dispersed by the device of this invention. Also applicable are the thermoplastic resins derived from pinewood which contains phenolic, aldehydic and etheric groups. The latter type are known under the trademark Vinsol Resins.[1] The polymerized rosins, under the trademark known as Poly-Pale Resins [1], their glycol, glyceryl, and glycerol esters. Petrex acid [1], which is a synthetic resinous polybasic acid of terpene origin consisting essentially of 3 - isopropyl-6-methyl-3,6-endoethylene also can be satisfactorily dispersed. Also dispersible are the hydrogenated rosins sold under the trademark Staybelite.[1]

While the rate of dispersion and solution of materials in water will be greatly enhanced by treatment in accordance with the present teachings, the invention is not limited solely to an aqueous medium, but is applicable to other liquid systems in which it is desired to dissolve or disperse the material. For example, the invention is useful to minimize the formation of gel lumps and increase the rate of solution of materials in organic solvents such as aromatic hydrocarbons, e.g., benzene, toluene, xylene and the like, aliphatic hydrocarbons, e.g., pentane, hexane, and the like, halohydrocarbons, e.g., chloroform, carbon tetrachloride, and the like, acetonitrile, dimethylsulfoxide acetone and the like.

[1] Hercules Powder Co.

In general, the flow rate and depth of the liquid layers can easily be determined by routine experimentation. It may vary somewhat depending upon the composition, mesh size, dispensing rate, of the material being dispersed and the concentration desired in the final solution. In practice, the flow rate should be sufficiently high to insure complete wetting of the particles before they have a chance to come in contact with each other.

In order to obtain optimum results it has been observed that it is essential that the liquid passing over the surface of the dispersing device be in the form of a thin film and not merely a stream flowing down the center of the surface. Moreover, it is necessary that the sides of the surface be level so that the film of liquid is of approximately the same depth at any point on the surface and does not flow to one side. In certain cases it may be possible to operate with liquid flowing over just the bottom surface. However, optimum results are obtained for most materials if both surfaces are employed.

In practice it has been found that the material being dispersed onto the flowing liquid must be finely divided and fall onto the liquid as a thin sheet. The line formed by the intersection of the liquid and sheet of material should be at right angles to the direction of liquid flow. Any of several means can be employed to dispense the material onto the liquid layer as long as it is dispensed as a thin sheet. For example, vibrators, sifting devices, and the like are all suitable. The only requirement is that the material be uniformly dispensed onto the liquid layer at a rate which permits complete wetting of the particles. Similarly, any of several methods can be utilized to mix the liquid containing the dispersed material after the liquid layers merge. Depending upon the choice of material and liquid it may be desirable to employ elevated temperatures during the mixing step to aid in solution.

Although the instant invention can be employed to increase the rate of solution of a wide variety of materials, it is also useful in the preparation of solutions containing greater concentrations of materials than heretofore thought possible. For example, prior to the instant invention, it was not possible by normal mixing techniques to prepare homogeneous solutions of high molecular weight material such as coagulant grade poly(ethylene oxide) in concentrations of greater than about 2 to 10 percent by weight without substantially affecting the molecular weight. This was undoubtedly due, in part, to an initial non-uniform dispersion and wetting of the particles necessitating mechanical mixing and shearing. Aqueouse solutions of poly-(ethylene oxide) in concentrations as low as 4 weight percent are rather viscous and gel like. Hence, if the particles do not dissolve at an even rate, the viscosity of the solutions may increase to a point where the remaining particles or lumps lack sufficient contact with the solvent to dissolve. In contrast, by the device of this invention, the particles are evenly dispersed in the solvent and hence dissolve at a uniform rate.

The present invention is particularly suited for the preparation of solutions of ethylene oxide polymers which have a reduced viscosity value of at least 0.5 and upwards to 75, and higher; or an aqueous viscosity at 25° C. of from 225 centipoises, as measured at a 5 weight percent concentration, to 12,000 centipoises, and higher, as measured at a 1 weight percent solution. The polymers for which the instant invention is particularly useful are the ethylene oxide homopolymers and ethylene oxide copolymers, terpolymers and the like, comprised of at least 50 weight percent of ethylene oxide in copolymerized form with up to 50 weight percent of at least one other lower olefin oxide such as propylene oxide, butylene oxide, styrene oxide, and the like.

The reduced viscosity is measured by the following method: Transfer 100 ml. of acetonitrile to an 8-oz., round, screw-cap bottle. With constant stirring introduce into the bottle, 0.200 gm. of the polymer weighed to the nearest mg. Line the screw-cap of the bottle with a piece of aluminum foil, carefully place the cap on the bottle, and tighten securely. Place the bottle on a suitable can roller with 6-inch (I.D.) rollers, and allow it to roll for 16±0.5 hr. Remove the bottle from the roller, and filter the solution by pressure through a coarse, sintered glass filter. Determine the time in seconds required for the sample solution to pass through a calibrated Ubbelohde suspended-level viscometer at 30±0.01° C. Use a suitable stopwatch with a 10-second dial graduated in 0.1 second units, accurate to within 0.1 percent when tested over a 60-minute period. Record the time required. Determine and record the time in seconds required for the acetonitrile to pass through the viscometer.

Calculation:

$$AS - \frac{F}{AS} = AC$$

$$SS - \frac{F}{SS} = SC$$

$$\frac{SC - AC}{AC} = SV$$

$$\frac{SV}{K} = RV$$

F = viscometer correction
AS = seconds required for acetonitrile
AC = seconds, corrected, required for the acetonitrile
SS = seconds required for polymer solution
SC = seconds, corrected, required for solution
SV = specific viscosity
RV = reduced viscosity
K = concentration, gm. sample per 100 ml. acetonitrile.

The following table illustrates the relation between the average molecular weight of poly(ethylene oxide), reduced viscosity and bulk viscosity of solutions thereof.

| Wt. percent polymer in acetonitrile | Reduced viscosity | Approximate average molecular wt. | Bulk viscosity aqueous solution at 25° C. |
|---|---|---|---|
| 0.2 | 1.5 | 150,000 | 200 cps. (5 wt. percent solution). |
| 0.2 | 60 | 10,000,000 | 7,000–9,000 cps. (1 wt. percent solution). |

The terms "aqueous viscosity," or "bulk viscosity" as employed herein, refer to the viscosity of the stated concentration of polymer in water, as measured on a Model RVF Brookfield Viscometer using a No. 1 spindle operated at 2 revolutions per minute, unless otherwise stated. The viscosity is measured at ambient room temperatures, that is about 24° C.

A further advantage of the dispersing device of this invention is that air or other gases are not drawn into the solution as would be the case with high speed mechanical mixers. Hence the necessity for degassing air trapped in solutions is not necessary.

By the dispersing device of this invention it is also possible to simultaneously disperse mixtures of two or more materials onto a liquid. This can be conveniently achieved by thoroughly blending the dry materials and thereafter dispensing the blended mixture onto the moving film of liquid. It should also be noted that the medium can itself consist of two or more miscible liquids which have been mixed prior to use in the dispersing device.

The following examples are illustrative:

Example 1

Using the dispersing device shown in FIGS. 1 and 2 and a water flow rate of approximately four gallons per minute, poly(ethylene oxide), grade WSRN-80[2], was dispensed onto the water film by adjusting the vibrator on the hopper containing the poly(ethylene oxide) to a medium setting. The water employed had a pH of 7.0. The resulting solution had a viscosity in centipoises of 22.8 as measured on a Brookfield Viscometer Model LVT using spindle No. 4 at 0.6 r.p.m. The solution had a concentration of 5.8 weight percent as determined by evaporation of water from a sample. There was no evidence of lump formation in the resulting solution and the solids dissolved almost instantly. Moreover, there was no evidence of molecular weight degradation of the polymer in solution.

Example 2

In a manner similar to that employed in Example 1 solutions of higher concentrations of poly(ethylene oxide) were prepared by decreasing the water flow rate below the four gallons per minute while dispensing the polymer at the same rate. In one case the resulting solution had a viscosity in centipoises of 37.0 and a concentration of 7.1 weight percent. Upon a further decrease in water flow rate, the solution had a viscosity of 163 centipoises and a concentration of 11.4 weight percent. In both instances solid dissolved almost instantly with no evidence of lump formation or change in molecular weight.

Example 3

Using the dispersing device shown in FIGS. 1 and 2 and a water flow rate of approximately four gallons per minute Cellosize[2] grade 1010-W (hydroxyethyl cellulose) was dispensed onto the water film by adjusting the vibrator on the hopper containing the product to a medium setting. The water employed had a pH of 6.8. The resulting solution after mixing for one hour had a viscosity of 37,000 centipoises and a concentration of 2.0 weight percent. A second run using water at 18° C. and having a pH of 9.4 gave a solution having a concentration of 2.0 weight percent and a viscosity after mixing for 24 hours of 28,000 centipoises.

Example 4

In a manner similar to that employed in the previous examples, Cellosize grade NPXH-1009 (uncoated hydroxyethylcellulose) was dispensed onto the water film. The water employed had a pH of 6.8 and was at room temperature. Two solutions were prepared having a concentration of 2.2 and 2.88 weight percent respectively and viscosities of 180,000 and 840,000 respectively.

Example 5

Using the dispersing device shown in FIGS. 1 and 2 and a water flow rate of approximately four gallons per minute, poly(ethylene oxide), coagulant grade, was dispensed onto the water film in the form of a thin sheet at a rate of 2.36 pounds per minute. The water employed had a pH of 7.0 and a temperature of 20–25° C. The resulting solution had a concentration of 4.0 weight percent. There was no evidence of lump formation and the solids dissolved almost instantly. Moreover, there was no evidence of molecular weight degradation of the polymer in solution.

In a similar manner, other solutions of the coagulant grade poly(ethylene oxide) were prepared in concentrations of from 0.1 to 12.0 weight percent. In all instances there was no evidence of molecular weight degradation.

In practice, the dispersing device of this invention can be constructed of most any material which is inert to the particular liquid and material being dispersed. For example, the surfaces over which the liquid layers flow can be composed of metal, plastic, e.g., Lucite, or other suitable material as long as it is smooth and allows the liquid to flow over it as a thin, uniform film. The mechanism for controlling the liquid and material flow rates can be selected from those known in the art. For example a wide variety of valves, automatic dispensers, or combinations thereof can be utilized to control liquid and material flow rates.

Although the invention has been illustrated by the preceding examples, it is not to be construed as being limited to the materials employed therein, but rather, the invention encompasses the generic areas as hereinbefore disclosed. Various modifications and embodiments of this invention can be made without departing from the spirit and scope thereof.

What is claimed is:

1. A dispersing device which is useful in the preparation, under non-shearing conditions, of solutions of materials which ordinarily are difficult to dissolve, said device comprised of, in combination, a first inclined surface over which passes a thin first layer of liquid, a second inclined surface positioned over and above said first surface, the lowest edge of which terminates at a point above said first surface so as to pass a second thin layer of liquid which merges with said first layer, a dispenser for dispensing a thin sheet of finely divided material onto said first layer at a point before the merger of said first and second layers, and at least one mechanism for controlling liquid flow and dispensing rates so as to provide a predetermined concentration of material in solution.

2. A process for increasing the ease of solution preparation in an aqueous medium of poly(ethylene oxide) having a reduced viscosity of at least 0.5 as measured at a concentration of 0.2 gram of said poly(ethylene oxide) in 100 milliliters water, which comprises passing a first thin film of water over a first inclined surface, passing a second thin film of water over a second inclined surface positioned over and above said first surface, the lowest edge of which terminates at a point above said first surface so that said first and second films of water merge, means for dispensing said poly(ethylene oxide) in finely divided form onto said first layer of water at a point before the merger of said films and means for collecting and mixing said water containing said poly(ethylene oxide) until solution is completed.

References Cited

UNITED STATES PATENTS

| | | | |
|---|---|---|---|
| 841,331 | 1/1907 | Lander | 23—267 |
| 2,802,599 | 8/1957 | Callahan et al. | 222—129.4X |

EVON C. BLUNK, Primary Examiner

H. S. LANE, Assistant Examiner

U.S. Cl. X.R.

23—312